United States Patent

Aho

[15] 3,640,594
[45] Feb. 8, 1972

[54] BEARING RETAINER CONSTRUCTION
[72] Inventor: Edwin Aho, Center Line, Mich.
[73] Assignee: Federal-Mogul Corporation, Southfield, Mich.
[22] Filed: Mar. 9, 1970
[21] Appl. No.: 17,741

[52] U.S. Cl............................................................308/212
[51] Int. Cl..............................................................F16c 33/34
[58] Field of Search..........................................308/212, 217

[56] References Cited

UNITED STATES PATENTS

| | | | |
|---|---|---|---|
| 2,765,202 | 10/1956 | Barr et al. | 308/217 |
| 3,110,529 | 11/1963 | Schaeffler | 308/217 |
| 3,228,090 | 1/1966 | Schaeffler | 308/217 |
| 3,482,891 | 12/1969 | Evangelista et al. | 308/217 |

Primary Examiner—Edgar W. Geoghegan
Assistant Examiner—Frank Susko
Attorney—Harness, Dickey & Pierce

[57] ABSTRACT

A roller bearing cage or retainer having pockets with pads provided to permit the rollers to be snapped into the pockets and past the pads with the pads having seats cooperating to hold the rollers in place and with the pads formed by a method whereby the location of the seats can easily be determined.

7 Claims, 6 Drawing Figures

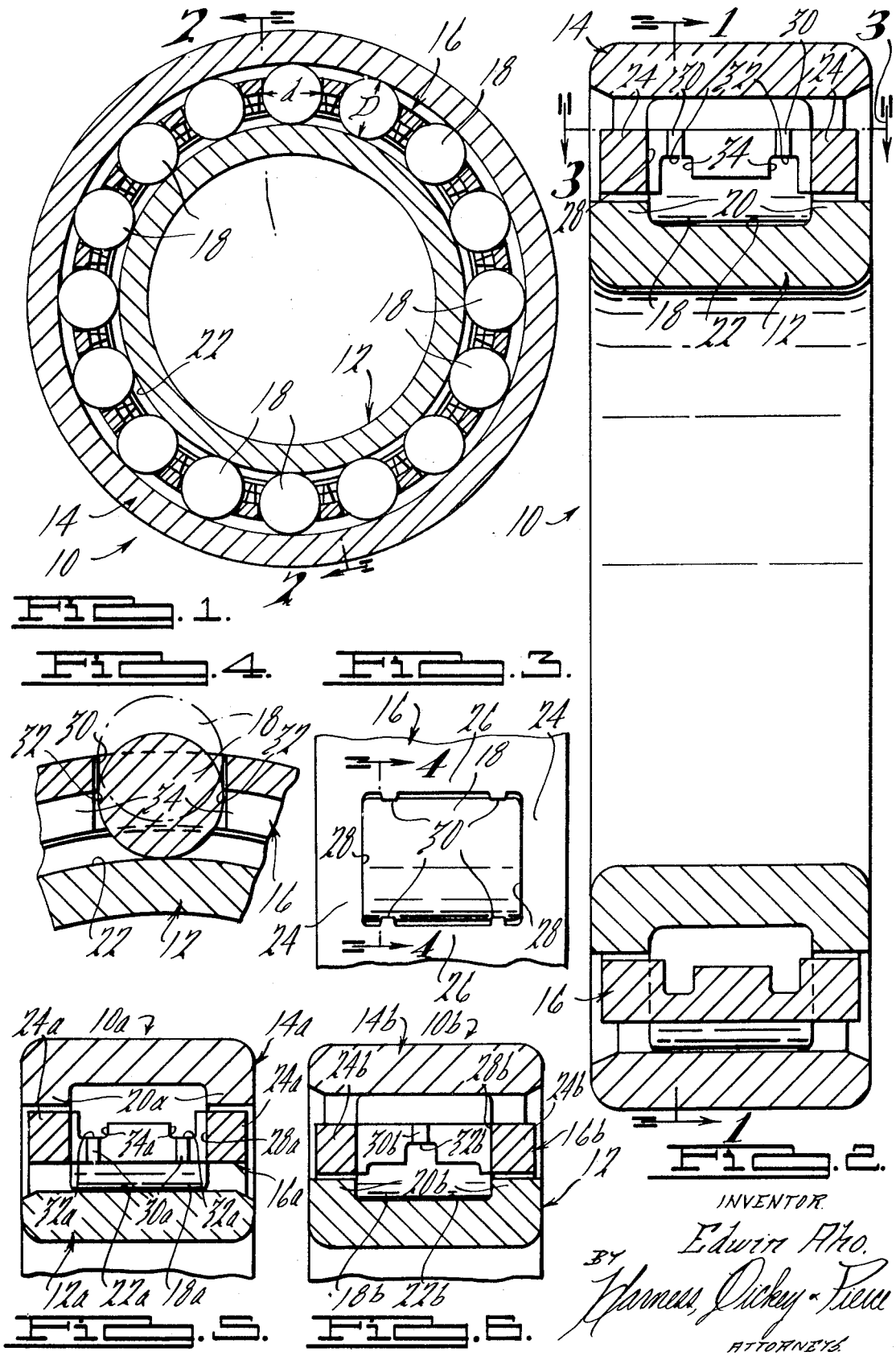

BEARING RETAINER CONSTRUCTION

SUMMARY

BACKGROUND OF THE INVENTION

The present invention relates to a bearing cage or retainer construction and method.

Bearing retainers or cages in which the rollers can be snapped into the pockets have a preselected interference with the rollers which permits the rollers to be snapped into and assist in holding the rollers in the pockets; in the present invention this interference is provided by pads which have a novel construction and which are formed by a novel method to provide an accurately determinable interference whereby rollers can be snapped into and out of pockets. At the same time the location of the seats determines the amount of clearance between the rollers and the seats and hence determines roller drop. With the present construction and method this clearance is accurately and easily determined. Therefore it is an object of the present invention to provide a new and improved retainer construction and method whereby accurately and easily located pads are utilized to form an interference fit whereby rollers can be snapped into and out of the retainer pockets and also to determine roller clearance. It is another object to provide a new and improved bearing retainer and method for making the same.

Other objects, features, and advantages of the present invention will become apparent from the subsequent description and the appended claims, taken in conjunction with the accompanying drawings, in which:

FIG. 1 is a sectional view of an inner race bearing assembly embodying features of the present invention taken substantially along the line 1—1 in FIG. 2;

FIG. 2 is a sectional view of the assembly of FIG. 1 taken substantially along the line 2—2 in FIG. 1;

FIG. 3 is an enlarged, fragmentary view taken generally along the line 3—3 in FIG. 2;

FIG. 4 is a view taken generally in the direction of the arrows 4—4 in FIG. 3;

FIG. 5 is a fragmentary sectional view, similar to FIG. 2, of an outer race bearing assembly utilizing features of the present invention; and FIG. 6 is a fragmentary sectional view of a modified form of the bearing assembly of FIG. 1.

Looking now to FIGS. 1–4, a bearing assembly 10 includes a double-shoulder inner race ring 12, an outer race ring 14, a cage 10, and a plurality of cylinder rollers 18. In the assembly 10 the inner race ring 12, cage 16 and rollers 18 are assembled together and are held together in a manner to be seen.

The inner ring 14 has a pair of annular shoulders 20 located on opposite sides of an annular raceway 22. The cage 16 is formed with a pair of axially spaced annular ring portions 24 connected by a plurality of equally circumferentially disposed ribs 26 with a plurality of pockets 28 being defined by adjacent ones of the ribs 26 and ring portions 24. Each rib 26 has a pair of axially spaced pads 30 formed thereon which extend into the associated pocket 28. The ribs 26 and pads 30 generally taper radially inwardly with the pads 30 having seats 32 at their radially inner extremities which define a distance $d$ which is less than the diameter $D$ of the rollers 18. The interference defined by the difference between distance $d$ and diameter $D$ is selected to permit the rollers 18 to be easily snapped past the seats 32 and into the pockets 28 with the interference of the seats 32 then holding the rollers 18, cage 16, and inner race ring 12 together. The radial location of the seats 32 will determine the amount of clearance between the roller 18 and seats 32; this clearance is selected to be a minimum such that roller drop will be minimized. It is desirable to provide minimum roller drop to facilitate the axial installation of the bearing assembly 10 onto a related shaft. In the form shown, the cage 16 is race guided, i.e., upon the inner ring shoulders 20, such that when assembled with the outer ring 14, the rollers 18 will not engage the seats 32. The seats 32 are relatively narrow axially to facilitate assembly of the rollers 18 and the cage 16 is race guided which prevents wear of the narrow seats 32. In the present invention, these seats 32 are easily radially located by the selection of the depth of circumferentially extending grooves 34. Initially the ribs 26 of cage 16 do not have grooves 34 and the pads 30 extend for the full width of ribs 26. The grooves 34 are accurately formed by making a circular cut through all of the ribs 26 at the same time in one machining operation to thereby accurately locate the seats 32.

FIG. 5 shows a similar construction for a double-shouldered outer race ring assembly. In the embodiment of FIG. 5 components similar to like components in FIG. 2 have been given the same number designation with the addition of the letter subscript $a$.

While two pads 30 are shown for each rib 26 a single-pad structure could be used. Such a structure is shown in FIG. 6 for a double-shoulder inner race. In the embodiment of FIG. 6 components similar to like components in FIG. 2 have been given the same number designation with the addition of the letter subscript $b$. A similar single-pad design for a double-shoulder outer race ring could be used.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In a bearing assembly including a plurality of rollers and a cage having a plurality of pockets for receiving the rollers, the improvement comprising: said pockets being defined by a plurality of ribs, at least some of said ribs having at least one pad extending into an associated pocket, said pad terminating at one radial end in a seat selected to define a preselected interference fit with one of the rollers whereby said one of the rollers can be snapped past said seat into and out of said associated pocket and with said seat radially located at a preselected position to provide a selected minimum clearance between one of the rollers and said seat whereby roller drop is minimized, a circumferential groove extending through said ribs in line with said pads and defining the radial location of said seat.

2. The assembly of claim 1 with each of said ribs including two of said pads, each with a cooperating circumferential groove, extending into each of said pockets.

3. The assembly of claim 1 with each of said ribs including only a single pad.

4. The assembly of claim 1 including a double-shouldered inner race ring and with said ribs tapering radially inwardly.

5. The assembly of claim 1 including a double-shouldered outer race ring and with said ribs tapering radially inwardly.

6. The bearing assembly of claim 4 with said pads and seats being relatively narrow and with said cage being guided on said inner ring whereby wear on said seats in minimized.

7. The bearing assembly of claim 5 with said pads and seats being relatively narrow and with said cage being guided on said outer ring whereby wear on said seats is minimized.

* * * * *